United States Patent
Kraus et al.

(10) Patent No.: US 6,793,404 B2
(45) Date of Patent: Sep. 21, 2004

(54) HOUSING HAVING A RETENTION MEMBER FOR AN OPTICAL FIBER

(75) Inventors: Roland Kraus, Evora (PT); Marnix Lannoije, Speyer (DE); Stefan Loeffelholz, Lorsch (DE)

(73) Assignee: Tyco Electronics AMP GmbH (DE)

( * ) Notice: Subject to any disclaimer, the term of this patent is extended or adjusted under 35 U.S.C. 154(b) by 47 days.

(21) Appl. No.: 10/067,688

(22) Filed: Feb. 4, 2002

(65) Prior Publication Data

US 2002/0154868 A1 Oct. 24, 2002

(30) Foreign Application Priority Data

Feb. 5, 2001 (DE) .......................................... 101 05 070

(51) Int. Cl.⁷ .............................................. G02B 6/36
(52) U.S. Cl. ....................................... 385/81; 439/460
(58) Field of Search .............................. 385/81, 78, 76; 439/460

(56) References Cited

U.S. PATENT DOCUMENTS

| | | | | |
|---|---|---|---|---|
| 4,211,462 A | * | 7/1980 | Wolfthal ..................... 439/460 |
| 4,327,964 A | * | 5/1982 | Haesly et al. ................. 385/78 |
| 4,730,892 A | * | 3/1988 | Anderson et al. ............. 385/70 |
| 4,735,477 A | | 4/1988 | Bowen ..................... 350/86.15 |
| 4,755,018 A | * | 7/1988 | Heng et al. .................... 385/65 |
| 4,986,625 A | * | 1/1991 | Yamada et al. ................ 385/55 |
| 5,133,033 A | | 7/1992 | Lukas et al. ................... 385/65 |
| 5,717,813 A | | 2/1998 | Harman et al. ............. 385/147 |
| 5,835,652 A | * | 11/1998 | Yagi et al. ..................... 385/87 |
| 6,048,108 A | * | 4/2000 | Vincent et al. ............... 385/98 |

FOREIGN PATENT DOCUMENTS

| EP | 0 290 188 | 4/1988 | ............ G02B/6/38 |
|---|---|---|---|
| EP | 0 431 768 A1 | 11/1990 | ............ G02B/6/38 |

OTHER PUBLICATIONS

European Patent Office, Search Report, dated May 22, 2003, app. No. EP 01 12 5879.

* cited by examiner

*Primary Examiner*—Neil Abrams
*Assistant Examiner*—Phoung Dinh

(57) ABSTRACT

The invention relates to an optical connector housing (100) for connecting an optical fiber to an optical element, such as a diode or a further optical fiber. The housing (100) comprises a substantially tubular receptacle (102) for one or more optical fibers and a retention member (104), which is received with interlocking fit in the housing (100) and is displaceable vertically to the optical fiber. In order to provide a housing (100) which fixes the optical fiber easily and inexpensively, yet securely, according to the invention the retention member (104) is manufactured from the same material and integrally with the housing (100). In the pre-assembly position, the retention member (104) is supported by webs (106) on the housing (100). During assembly, the retention member (104) is displaced in such a way that it engages the optical fiber and secures it against axial displacement.

23 Claims, 4 Drawing Sheets

HOUSING HAVING A RETENTION MEMBER FOR AN OPTICAL FIBER

BACKGROUND OF THE INVENTION

The present invention relates to a fiber optic connector and more particularly to a housing having a retention member for retaining an optical fiber.

DESCRIPTION OF THE PRIOR ART

In complex data bus transmission systems, for example in communications and information networks, plastic optical fibers are increasingly being used for data transfer. Such systems ensure high rates of transfer, enable trouble-free signal transmission, are insensitive to electromagnetic interference and reduce the cabling outlay to cut down cost and weight. An application for such an optical bus is in communications systems of a motor vehicle. For example, audio components, CD changer, voice-controlled system, built-in car phone and further elements may connect to one another by an optical bus such as a fiber-optic ring. Utilizing the fiber-optic ring, synchronous or asynchronous data transfer systems may be implemented at an adequately high baud rate.

Coupling of the optical fibers to the individual electronic components or coupling of a plurality of optical fibers to one another is typically accomplished by special fiber optic connectors having housings in which an optical fiber is connected to another optical fiber or to an optical component.

Particularly in the field of motor vehicle electronics, because of extremely hostile ambient conditions, the connection of the optical fibers has to meet stringent requirements with regard to resistance to vibration and corrosion but also with regard to thermal stability. Coupling of the optical fibers has to be achieved inexpensively and preferably in an automated manner.

A conventional method of securing an optical fiber in a housing utilizes metal clips, as shown in FIG. 4. The housing 130 has a receptacle 102 for the optical fiber 122 and a receptacle 124 for a metal clip 120. The optical fiber 122 is positioned in the receptacle 102 of the housing 130 and mechanically secured against axial displacement by insertion of the metal clip 120. This technique enables the mounting and latching of optical fibers having different lengths. The optical fiber 122 is secured by the metal clip 120 in the housing 130 and hence ensures the connection to another optical fiber. This solution however has a drawback in that assembly always involves the positioning of an additional metal part namely the clip 120. This adds to the cost of the assembly operation.

Another possible way of fastening optical fibers to a housing is by laser welding or other bonding techniques. However, the hardware and set up costs for these techniques is considerable. Additionally, these techniques result in a permanent connection between the optical fiber and the housing. Repair of the connection is therefore complicated.

SUMMARY OF THE INVENTION

An object of the present invention is to provide a fiber optic connector housing for connecting an optical fiber to an optical element, which allows the optical fibers to be fastened as easily and inexpensively as possible.

This and other objects are achieved by providing an optical connector housing according to the invention for connecting an optical fiber to an optical component. The housing has a retention member made from the same material as the housing. As a result, the retention member and housing may be simultaneously formed, thereby reducing production costs.

According to one embodiment, the retention member is formed integrally with the housing. Retaining webs are provided, which prevent the retention member in the pre-assembly state from falling out and becoming lost and, may be broken during assembly by applying only slight forces to displace or engage the retention member.

A surface of the housing which receives the optical fiber may be provided with teeth. This arrangement has the advantage that the optical fiber is protected in a particularly effective manner from unintentional axial displacement. This arrangement also reduces the insertion forces needed to assemble the retention member.

According to a further embodiment, the retention member has a receptacle for a plunger of an assembly tool. The receptacle serves to facilitate positioning of the assembly tool and assembly is therefore simplified.

Recesses and guide projections may also be provided along the housing to ensure that the retention member is displaced exactly normal to the optical fiber.

To prevent unintentional displacement of the retention member in the assembled state, the guide projections may be bevelled in such a way that they frictionally engage the retention member when inserted. This offers the advantage of a reliable stop during assembly and allows the forces acting upon the optical fibers to be kept as low as possible.

BRIEF DESCRIPTION OF THE DRAWINGS

The invention will now be described by way of example with reference to the accompanying figures of which.

DETAILED DESCRIPTION OF THE PREFERRED EMBODIMENT

Figure 1:
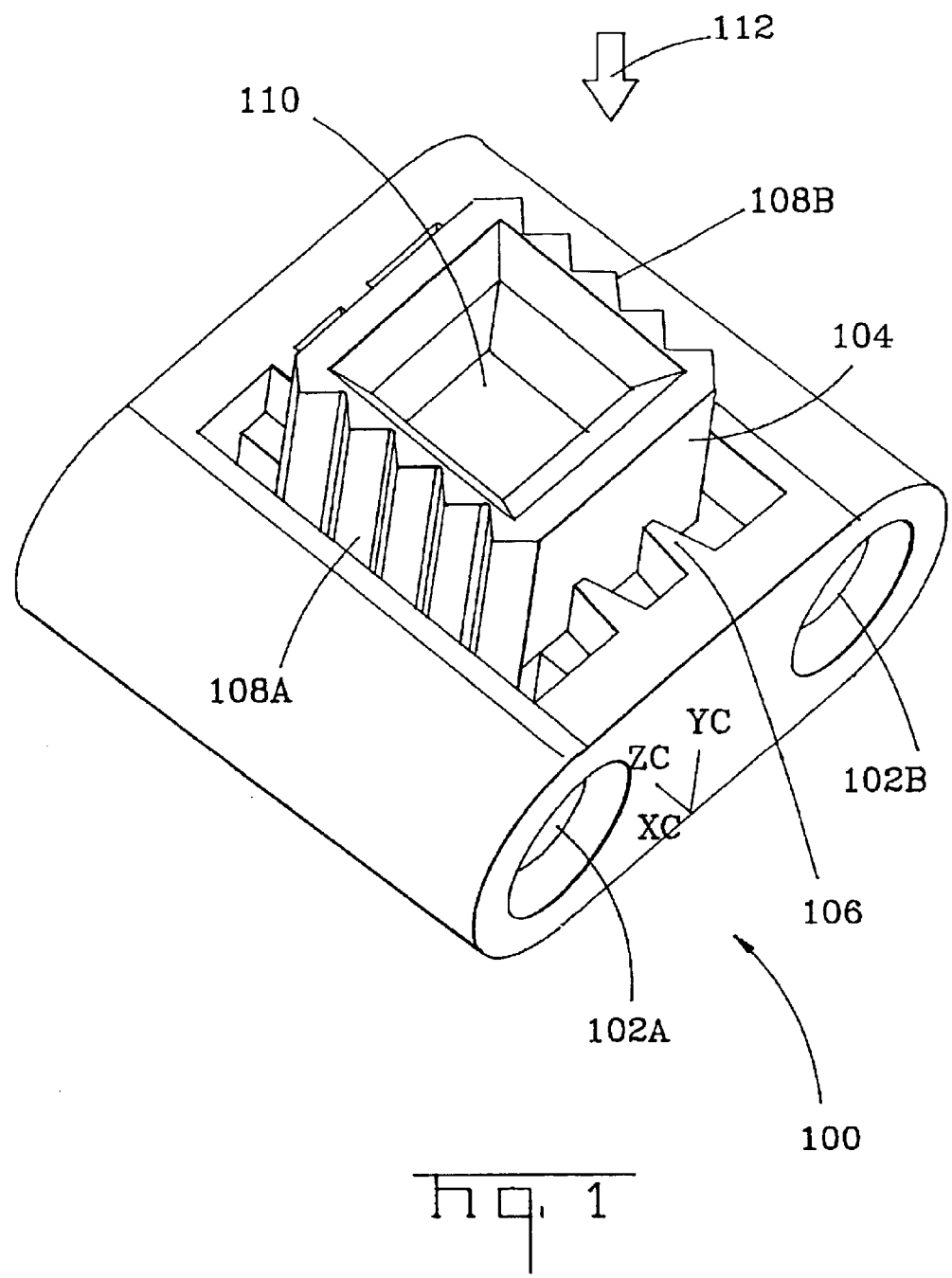
FIG. 1 is a perspective view of a fiber optic connector housing for connecting an optical fiber to an optical element according to a first embodiment of the invention.

Embodiments of the invention are described in detail below. Similar or corresponding elements of the illustrations according to the invention are provided with the same reference numbers.

The drawings show only the elements of the housing, which may be manufactured from injection moulding materials, such as plastics. The optical fiber, which has a circular cross section and is preferably also made of plastic, is not shown in the drawings and is not described in detail. Equally, for the sake of clarity, the optical elements, to which the optical fiber is to be coupled by the housing, are not shown in the drawings. Such optical elements may be, for example, further optical fibers or a diode or any passive or active optical component.

As shown in FIG. 1 in a first embodiment, the housing 100 according to the invention comprises two substantially tubular receptacles 102A, 102B each for receiving an optical fiber. A retention member 104, which is made of the same material as the rest of the housing, is shown here in a pre-assembled state.

Frangible retaining webs 106, which are manufactured integrally with the retention member and the housing, fix the retention member 104 in a pre-assembled position such that it does not project into the insertion openings 102a and 102b. In the pre-assembled position, the optical fibers may be inserted into the openings 102A, 102B without any insertion force.

Once the optical fibers have been properly positioned by a guide 105 and a stop 107 in the interior of the housing 100, a plunger of an assembly tool, which is positioned in the receiving opening 110, is used to apply an adequate insertion force in the direction of the arrow 112 such that the retaining webs 106 are broken and the retention member 104 is pushed vertically into the insertion region 102A and 102B. The teeth 108A, 108B then engage the optical fibers.

Figure 2:
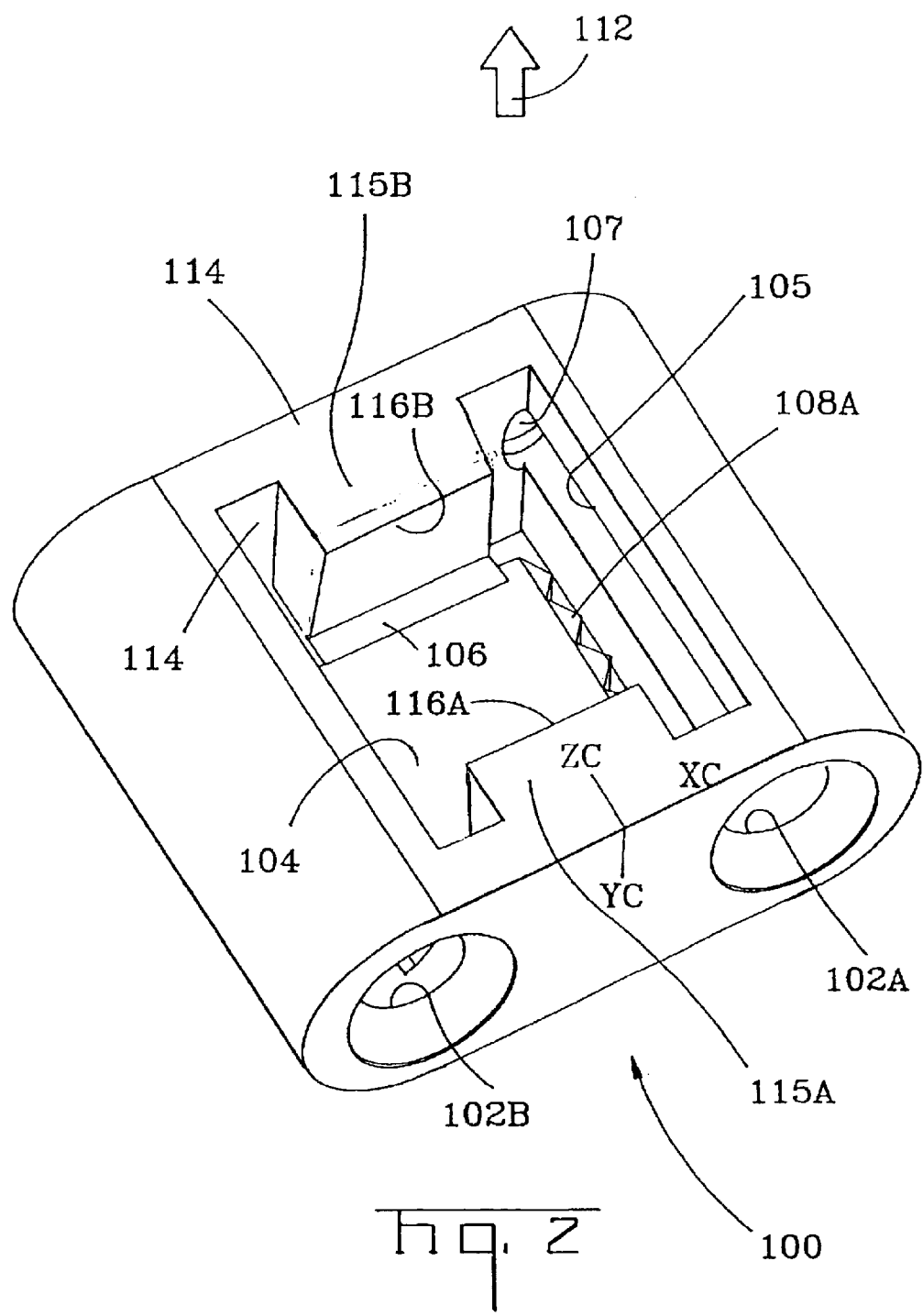
FIG. 2 is an inverted perspective view of the housing shown in FIG. 1.

FIG. 2 shows an inverted perspective view of the housing 100 shown in FIG. 1. Here it is possible to see the tubular receptacles 102A, 102B for the optical fibers, which are open in the region of the teeth 108A, 108B of the retention member 104, so that the optical fibers are firmly clamped after the retention member 104 has been urged into the insertion region 102A, 102B.

The retaining webs 106, which are manufactured with the retention member 104 and the housing 100 in moulding operation, have to be dimensioned in such a way that guarantees reliable retention of the retention member 104 in the pre-assembly state and, enables the retention member 104 to be movable in the insertion direction 112 by applying as low a force as possible. Guide projections 115A, 115B guarantee that the retention member 104, is displaced in the insertion direction 112 normal to the optical fiber. A bottom surface of the assembly tool may be utilized as a stop to prevent the retention member 104 from being pressed too far in the insertion direction 112. Alternatively, however, the side surfaces 116A and 116B of the guide projections 115 may be bevelled in such a way that the retention member 104 is clamped tightly as it is further displaced in the direction 112.

Figure 3:
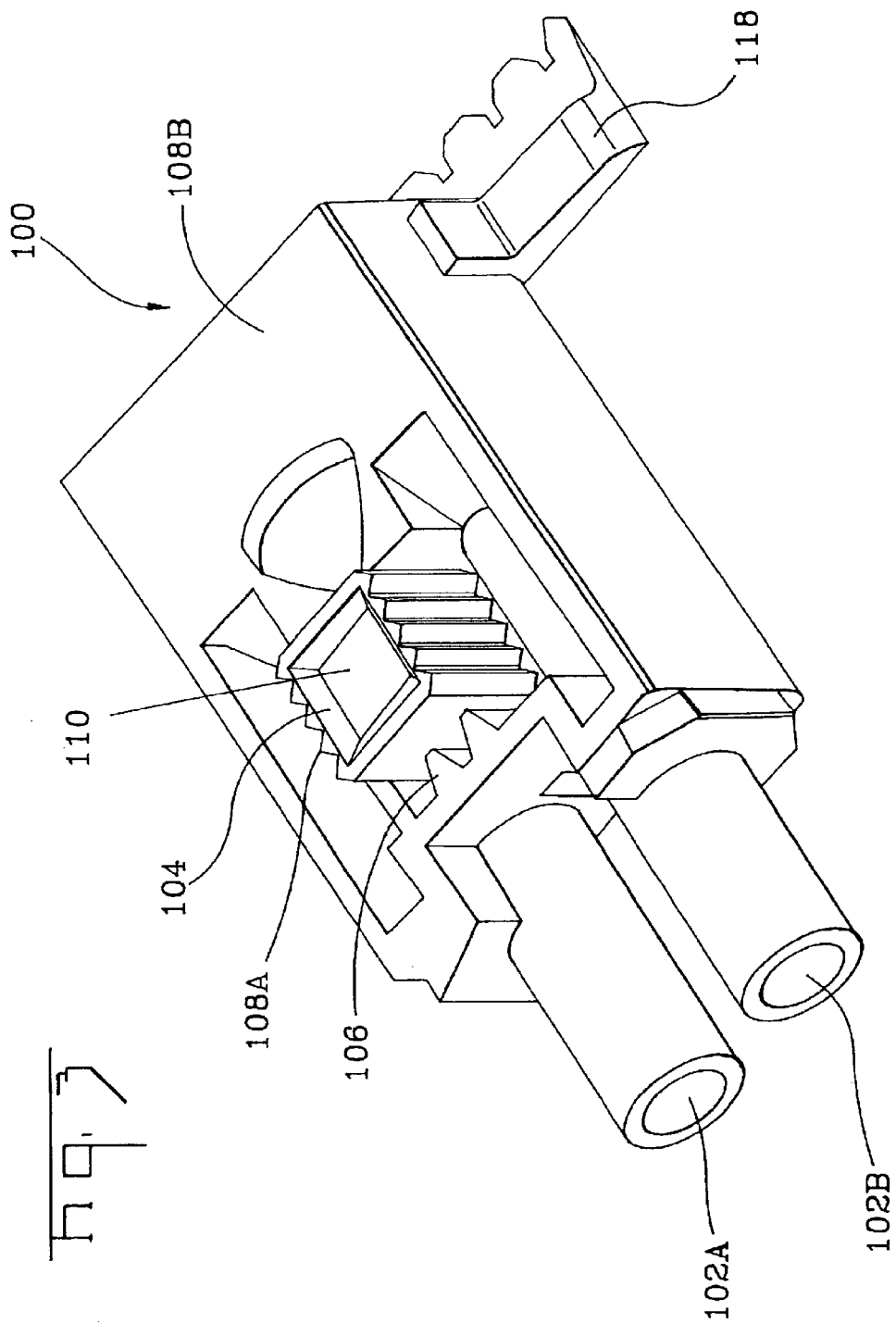
FIG. 3 is a perspective view of a fiber optic connector housing for connecting two optical fibers to optical elements according to a second embodiment.
Figure 4:
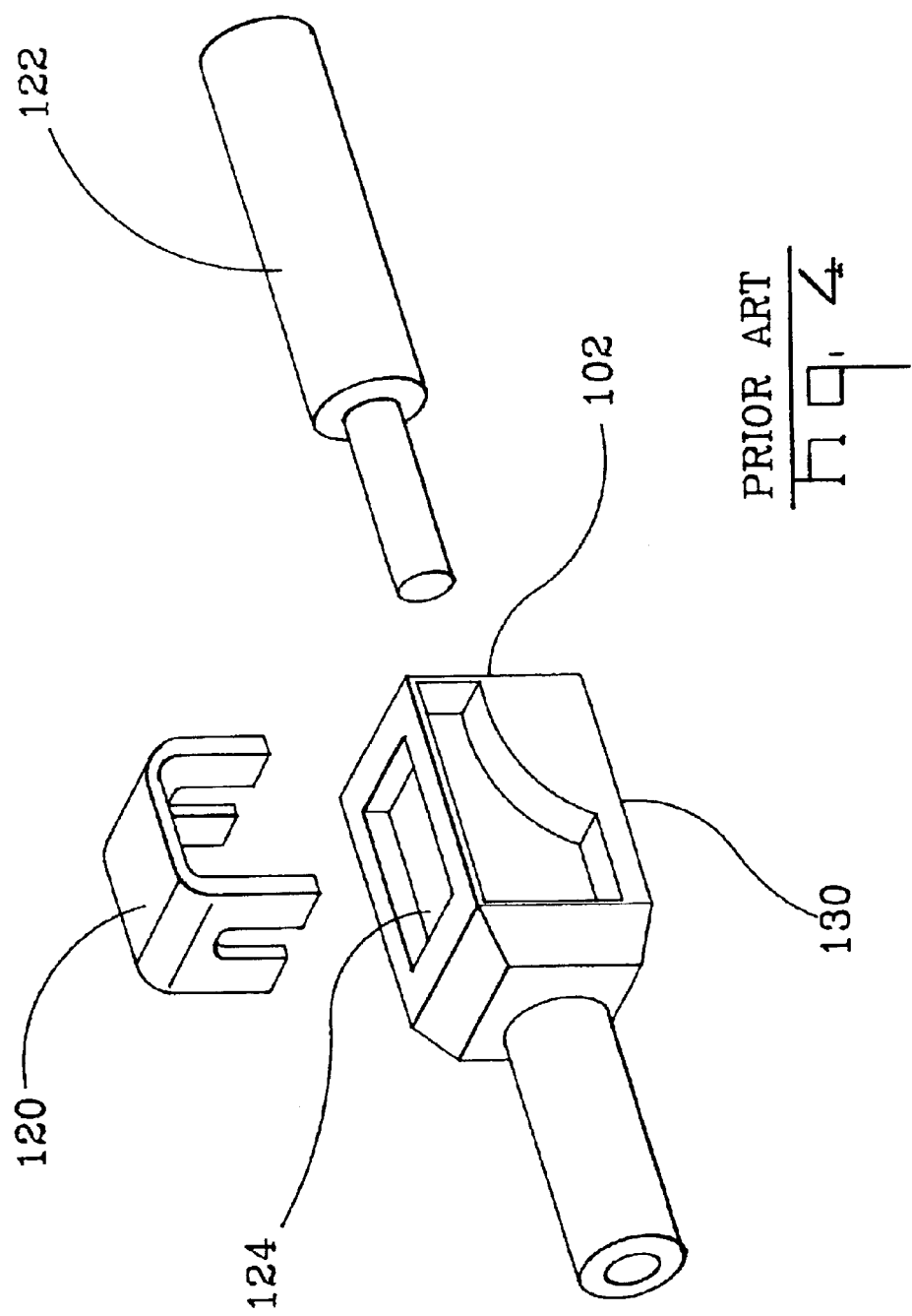
FIG. 4 is a perspective view of a conventional fiber optic connector housing having a metal clip for fastening of the optical fiber.

FIG. 3 shows a housing 100 for connecting two optical fibers to an optical component, which comprises diodes, according to a second embodiment. The receptacles 102A, 102B for the optical fibers extend in an outward direction as tubular insertion aids. Situated at the opposite side of the housing 100 to the receptacles 102A, 102B is a holding device 118 for receiving the optical component (not shown). In this embodiment, the retention member 104 is initially supported by integrally moulded frangible retaining webs 106 in its pre-assembled state on the housing 100. Teeth 108A, 108B are similarly situated on the surfaces which engage the optical fibers. A receiving opening 110 for an assembly tool enables exact positioning of a plunger, which presses the retention member 104 inwards in order to fix the two optical fibers into the receiving openings 102A and 102B.

While the embodiments show a housing 100 for coupling fibers to optical components, the housing according to the invention might also be part of a "cable-to-cable" coupling for interconnecting a plurality of optical fiber ends.

What is claimed is:

1. A housing for receiving an optical fiber having a receptacle for the optical fiber, the housing comprising:

a retention member being made of the same material as the housing and initially supported in a pre-assembly position over the receptacle on the housing; and the housing having guide projections along which the retention member is displaceable, the guide projections are beveled such that the retention member is fixed by clamping when inserted.

2. The housing according to claim 1, wherein the retention member is formed integrally with the housing.

3. The housing according to claim 1, wherein the retention member further comprises teeth disposed on a surface of the retention member for engaging the optical fiber.

4. The housing according to claim 1, wherein the retention member further comprises a receptacle for receiving a plunger of an assembly tool.

5. The housing according to claim 1, further comprising a tubular insertion aid formed as an extension into the receptacle.

6. The housing according to claim 1, wherein the housing comprises two receptacles; into which two optical fibers are respectively insertable substantially parallel to one another and the optical fibers are fixable by means of the same retention member.

7. An optical connector comprising:

a housing having at least one receptacle which is open to a first side and open to a second side thereof;

a fiber being received through the first side into the receptacle;

a retention member being received from the second side into the receptacle and being in engagement with the fiber to retain the fiber within the receptacle;

at least one frangible web supporting the retention member in the housing so that the retention member is displaceable in a direction normal to the fiber; and the housing having guide projections along which the retention member is displaceable.

8. The optical connector according to claim 7, wherein the retention member is integrally formed with the housing in a pre-assembled position over the second side of the receptacle.

9. The optical connector according to claim 8, wherein the retention member is joined to the housing by the at least one frangible web.

10. The optical connector according to claim 7, wherein the retention member further comprises teeth disposed on a side thereof in engagement with the optical fiber.

11. The optical connector according to claim 7, wherein the retention member further comprises a second receptacle for receiving a plunger of an assembly tool.

12. The optical connector according to claim 7, wherein the guide projections are bevelled such that the retention member is frictionally fixed when inserted into the receptacle.

13. The optical connector according to claim 7, further comprising a tubular insertion aid formed as an extension into the receptacle.

14. The optical connector according to claim 7, wherein the housing comprises two receptacles into which two optical fibers are insertable substantially parallel to one another and secured in the receptacle by the same retention member inserted from the second side.

15. The housing according to claim 1, wherein the retention member is supported in the pre-assembly position by a frangible retaining web.

16. The housing according to claim 2, wherein the retention member and the housing are moulded from plastic.

17. The optical connector according to claim 7, wherein the housing, the retention member, and the frangible web are made from the same material.

18. A housing for receiving an optical fiber having a receptacle for the optical fiber, the housing comprising:
- a retention member formed integrally with the housing and initially supported in a pre-assembly position over the receptacle of the housing by at least one frangible web that is severable from the housing to completely separate the retention member from the housing when the retention member is displaced into an assembly position; and
- guide projections along which the retention member is displaceable.

19. The housing according to claim 18, wherein the retention member includes teeth disposed on a surface of the retention member for engaging the optical fiber.

20. The housing according to claim 18, wherein the retention member includes a receptacle for receiving a plunger of an assembly tool.

21. The housing according to claim 18, wherein the guide projections are beveled such that the retention member is fixed by clamping when inserted.

22. The housing according to claim 18, further comprising a tubular insertion aid formed as an extension into the receptacle.

23. The housing according to claim 18, wherein the housing includes two receptacles into which two optical fibers are respectively insertable substantially parallel to one another and the optical fibers are fixable by means of the same retention member.

* * * * *